April 29, 1958   G. C. HODGENS   2,832,240
LATHE-TYPE DRILL
Filed Nov. 12, 1954
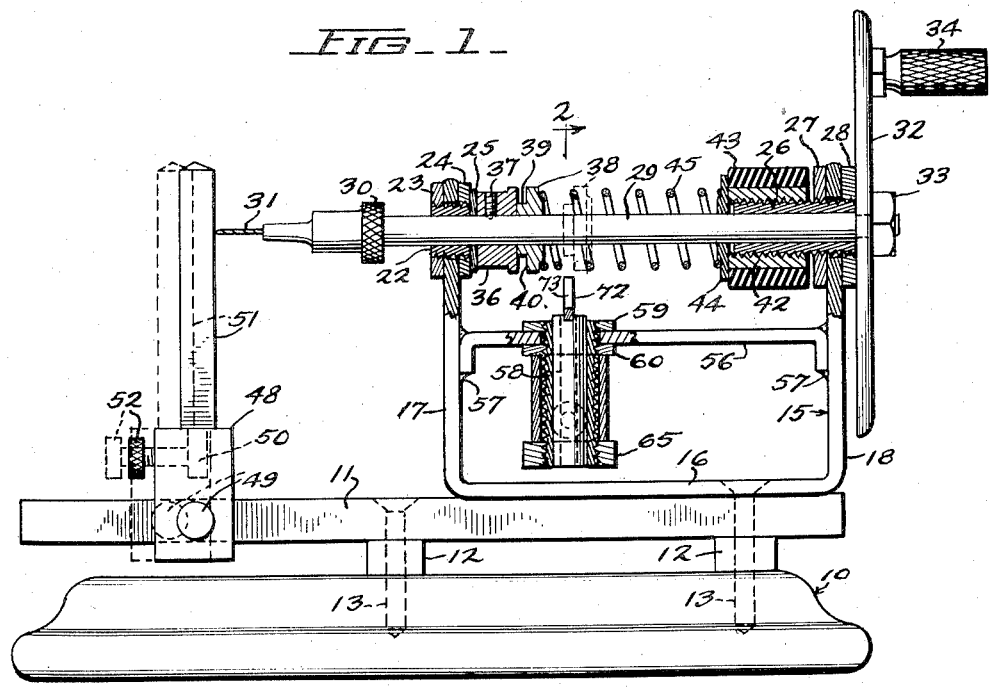
Fig. 1
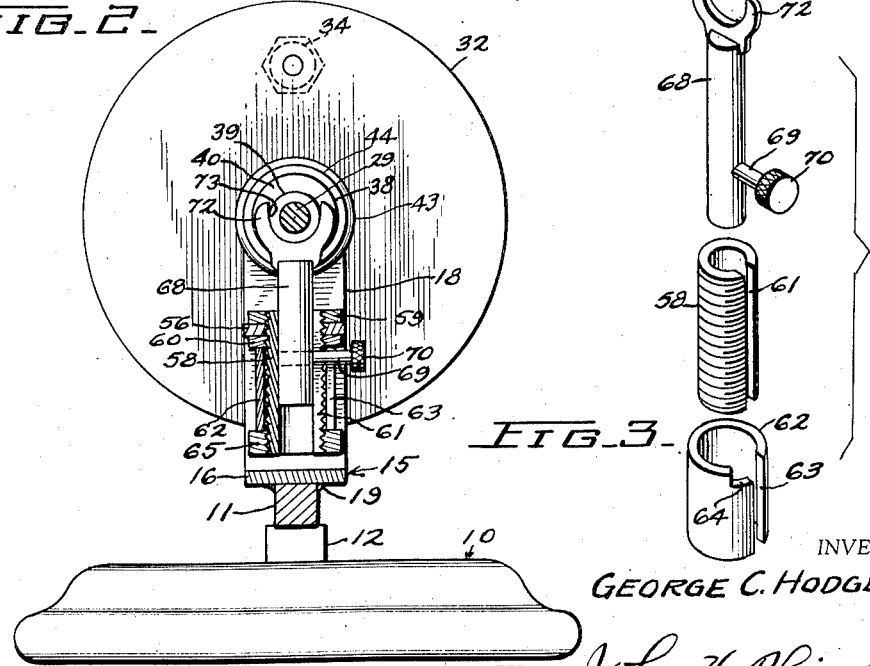
Fig. 2
Fig. 3
INVENTOR
GEORGE C. HODGENS
BY 
ATTORNEY

United States Patent Office 2,832,240
Patented Apr. 29, 1958

2,832,240

LATHE-TYPE DRILL

George C. Hodgens, Raleigh, N. C.

Application November 12, 1954, Serial No. 468,281

5 Claims. (Cl. 77—32)

This invention relates to a lathe-type drill, and more particularly to a device for drilling small objects such as eyeglass frames.

It has been the common practice in drilling small objects to employ a hand drill which is frequently awkward to use because of the necessity for supporting the drill with one hand while turning the crank with the other, thus rendering it difficult to drill a hole at the proper place without clamping the article to be drilled. This difficulty has been encountered, for example, in drilling openings in eyeglass frames which are frequently provided with decorative metallic elements or designs across the tops of the frames thereof.

An important object in the present device is to provide a novel lathe-type drill operative in conjunction with a work support and of such nature that the operator may hold an article to be drilled in position against the work support and accurately drill an opening at the desired point merely by turning the crank of the drill.

A further object is to provide such a device having means for limiting movement of the drill bit and associated elements in a drilling operation, and to provide in conjunction therewith a vertical work support which, if desired, may be moved into light contact with the point of the drill bit and fixed in such position, whereupon the operator may retract the drill chuck, place in position the article to be drilled, and then effect the drilling operation, the drill bit stopping at the point where it has completely penetrated the article and without drilling into the work support.

A further object is to provide novel spring means for feeding the drill in a drilling operation, thus requiring that the operator merely rotate the drill shaft without effecting any feeding of the drill bit.

A further object is to provide such a device wherein the spring for feeding the drill is associated with a retractable element which may be moved from operative position and locked in an inoperative position when the drilling operation is such that the operator desires to effect the feeding of the drill manually.

A further object is to provide such a device wherein the element associated with the spring and capable of being locked in operative position normally bears against the means which limits movement of the drill bit whereby compression of the spring is normally utilized for feeding the drill bit through the work.

A further object is to provide novel means cooperating with the spring-pressed element for positively locking the latter in a position to render the feed spring inoperative.

Other objects and advantages of the invention will become apparent during the course of the following description.

In the drawing I have shown one embodiment of the invention. In this showing:

Figure 1 is a side elevation of the device, parts being shown in section.

Figure 2 is a section on line 2—2 of Figure 1 showing the movable spring seat in retracted locked position, parts being shown in elevation; and Figure 3 is a perspective view of elements associated with the locking device, the parts being shown separated.

Referring to Figures 1 and 2, the numeral 10 designates a supporting base for the device and this base is preferably made of cast iron to provide the device with the necessary weight and stability to hold it in a given position without the necessity of having to clamp the device in position on a work bench or the like. Above the base and extending longitudinally thereof is a guiding and supporting bar 11, preferably square in cross-section as shown in Figure 2, and spaced above the upper face of the base 10 by spacing blocks 12, the bar 11 and blocks 12 being fixed to the base by a suitable means such as screws 13.

Above one end portion of the bar 11 is arranged a generally U-shaped support indicated as a whole by the numeral 15. This support is preferably integral and comprises a bottom portion 16 and upstanding spaced parallel arms 17 and 18. The bottom of the base portion 16 may be secured in position partly by one of the screws 13, but is preferably also welded as at 19 (Figure 2) to the bar 11.

The arm 17 supports in its upper end a bearing 22 externally threaded for reception in nuts 23 and 24 which clamp the bearing 22 relative to the arm 17. An end bearing washer 25 may be arranged against the nut 24 and the adjacent end of the bearing 22.

The upper end of the arm 18 supports a substantially elongated externally threaded bearing sleeve 26 clamped in position relative to the upper end of the arm 18 by nuts 27 and 28. The bearings 22 and 26 support a drill shaft 29 one end of which, outwardly of the bearing 22, carries a conventional chuck 30 adapted to receive a drill bit 31. The other end of the shaft 29 carries a disk 32 secured to the adjacent end of the shaft 29 as at 33 and provided with an operating handle 34 by means of which the disk 32 and shaft 29 may be manually rotated.

A stop member 36 surrounds the shaft 29 and is fixed thereto by any suitable means such as a set screw 37. Normally, the stop member 36 engages the bearing washer 25. Against the inner face of the stop member 36 is arranged a collar 38 having its end adjacent the stop member 36 annularly grooved as at 39 to form an annular shoulder 40 for a purpose to be described.

The bearing sleeve 26 as shown in Figure 1 projects inwardly substantially beyond the nut 27 and is threaded in a sleeve 42 surrounded by a rubber or similar sleeve 43 to facilitate turning of the sleeve 42 on the bearing 26 for adjusting purposes, as described below. A spring seat 44 bears against the sleeve 42 at the inner end thereof and a compression spring 45 has opposite ends engaging the spring seat 44 and collar 38. It will be apparent that this spring urges the collar 38 toward the left as viewed in Figure 1, and since it is slidable on the shaft 29, the collar 38 normally engages the stop member 36 to maintain the latter in engagement with the bearing washer 25.

A block 48 is mounted to slide on the bar 11, which obviously is provided with a relatively long free end projecting to the left of the adjacent spacer block 12. Such projecting end of the bar 11, however, will be relatively rigid because of the cross-sectional area of this bar and the fact that it is preferably formed of steel. The block 48 is free to slide on the projecting end of the bar 11 and is fixed in adjusted position thereon by means of a set screw 49. The block 48 projects substantially above the bar 11 and is apertured to receive the lower reduced end 50 of a work support 51 in the form of a vertical post extending upwardly from the block 48. Interchangeable work supports may be employed and may be fixed in position by a set screw 52 threaded in the block 48 and engaging the lower end 50 of the work support.

As stated, the collar 38 normally engages the stop member 36 and such engagement is normally maintained by the spring 45. Means are provided for rendering the spring 45 inoperative for causing contact between the collar 38 and member 36. Referring to Figures 1 and 2, the numeral 56 designates a cross member extending between the support arms 17 and 18. The member 56 is turned downwardly at its ends and preferably welded as at 57 to the respective arms 17 and 18. An externally threaded sleeve 58, shown in detail in Figure 3, has its upper end extending through the cross member 56 and fixed with respect thereto by jam nuts 59 and 60. The sleeve 58 is longitudinally slotted throughout its length as at 61 for a purpose which will become apparent.

Loosely surrounding the threads of the sleeve 58 is a lock sleeve 62 also shown in detail in Figure 3 and provided with a longitudinal slot 63 extending throughout its length and circumferentially enlarged at its upper end to provide a shoulder 64. The sleeve 62 is arranged between the nut 60 and a lower nut 65 threaded on the lower end of the sleeve 58.

A stem 68 is slidable in the sleeve 58 and is provided with a radially outwardly extending pin 69 having a small knurled knob 70 fixed to its outer end. The pin 69 is vertically slidable in the slots 61 and 63 and when it is in the upper end of the latter slot, the sleeve 62 may be slightly rotated counterclockwise as viewed in Figure 3 to move the shoulder 64 beneath the pin 69 to support the stem 68 in its upper position.

At its upper end, the stem 68 carries a yoke 72 having a semi-circular cut-out 73 in the top thereof corresponding generally to the diameter of the groove 39. The yoke 72, as shown in Figure 1, lies in a plane transverse to the axis of the shaft 29 and is maintained in such position by the groove 61, it being apparent that the sleeve 58 is fixed against rotation by the nuts 59 and 60. The yoke 72 has its right-hand face arranged in a vertical plane spaced from the shoulder 40 a distance equal to the space between the nut 23 and the adjacent end of the chuck 30.

Operation

Ordinarily, the article to be drilled will be supported by the left hand of the operator against the inner face of the post or work holder 51. Under such conditions, the operator, when desiring to use the device, will loosen the thumb screw 49, slide the block 48 to the right until the inner face of the post 51 lightly engages the end of the drill bit, and then clamp the thumb screw 49 to fix the work holder in such position. If an opening is to be drilled in an article without completely penetrating it, the work holder may be adjusted away from the drill bit, for example, as suggested in dotted lines in Figure 1.

Assuming that the work holder is adjusted to the solid-line position in Figure 1 and an article has been marked at a point at which an opening is to be drilled, the operator will retract the chuck 30 against the tension of the spring 45. The article will then be placed against the inner face of the work holder 51, and the operator will slowly release the chuck 30 to permit the drill bit 31 to engage against the article, being careful that the end of the bit accurately engages the marked point on the article. Supporting the article in such position, it merely is necessary for the operator to turn the crank 34 to effect the drilling operation.

It will be apparent that when the drilling operation is started, the end of the drill bit will be spaced from the work holder 51 a distance equal to the thickness of the article to be drilled. The stop member 36 will be spaced a similar distance from the washer 25. As the handle 34 is operated to rotate the shaft 29, the drilling operation will take place and the spring 45, acting through the collar 38, will feed the stop member 36 toward the left and similar movement will be imparted to the shaft 29. When the stop member 36 engages the washer 25, the drilling operation will be completed, whereupon the drill may be retracted and the article removed.

Wheer it is desired to drill an opening partly through an article, for example, for the purpose of inserting a screw thereinto, the work holder 51 will be adjusted to the left of the solid-line position in Figure 1, for example, to the dotted-line position or to any other position spaced from the drill a distance equal to the thickness of the article to be left undrilled. The drilling operation is carried out as before and the collar 36 will limit movement of the drill to the proper point in penetrating the article.

For different materials, a different spring pressure may be desired for feeding the drill through the article. This readily may be accomplished by rotating the sleeve 43 and the inner metallic sleeve 42 to move the spring seat axially relative to the shaft 29 to adjust the spring tension.

Under some conditions, for example in a delicate drilling operation in fragile material, the operator may desire to feed the drill manually through the material. Under such conditions, he readily may render the spring 45 inoperative. It is required merely that the operator move the chuck 30 toward the right in Figure 1 until its movement is limited by the nut 23. When this movement is effected, the groove 39 will lie directly above the yoke 72. It then merely is necessary for the operator to hold the chuck in such a position and to move the stem 68 upwardly. The recess 73 will receive the grooved portion of the collar 38 and the yoke will engage the shoulder 40. While supporting the stem 68, the operator will release the chuck 30, whereupon the spring 45 acts to frictionally engage the shoulder 40 with the yoke 72 to support the stem 68 in its upper position. It will be apparent that in its retracted position, the collar 38 will occupy the dotted-line position shown in Figure 1.

For drilling an individual article, it is not necessary to lock the stem 68 in its upper position since it will be held in such position by the frictional engagement referred to. If desired, for example, when a number of articles are to be drilled without using the spring feed, the collar 62 may be rotated to bring the shoulder 64 into position beneath the pin 69, and this shoulder acts as positive means for supporting the stem 68 in its upper position. In drilling without the spring feed, it merely is necessary for the operator to turn the handle 34 around the axis of the shaft 29 and to exert pressure axially of the shaft 29 to effect the feeding of the drill through the article. This axial pressure may be determined in accordance with the judgment and experience of the operator.

From the foregoing it will be apparent that the present device provides an extremely handy and easily operable lathe-type drill for drilling small articles, with or without the provision of a spring feeding force. It also will be apparent that the compression of the spring is readily adjustable according to the material being drilled. The rendering of the spring 45 inoperative is very simply and easily accomplished in the manner described above. As previously stated, the device is particularly intended for drilling small articles such as plastic eyeglass frames, and such drilling requires very little force for the turning of the handle 34. The use of a heavy base 10 made, for example, of cast iron, is desirable, since it has been found that it provides the device with the necessary weight and stability to hold it in any given position on a work bench or the like without the necessity of having to clamp it in position.

It is to be understood that the form of the invention shown and described is to be taken as a preferred embodiment of the same, but that various changes in the construction of the device may be made without departing from the scope of the appended claims.

I claim:

1. A tool comprising a pair of spaced bearings, a shaft supported by said bearings for rotation and axial movement, a tool chuck carried by said shaft, a positive stop member fixed to said shaft and rotatably engageable with one of said bearings to limit movement toward the work of a tool carried by said chuck, a stationary spring seat surrounding said shaft, a collar slidably mounted on said shaft and normally engaging said stop member, a spring surrounding said shaft and interposed between said spring seat and said collar whereby said spring, through said collar, exerts a force against said stop member to normally maintain it in engagement with said one bearing, and means for locking said collar against movement axially of said shaft at a point spaced from said stop member to render said spring ineffective for moving said stop member.

2. A device in accordance with claim 1 wherein said collar is provided with an annular shoulder facing toward said stop member, said means for locking said collar comprising a vertically movable member normally arranged out of the path of axial movement of said collar and movable upwardly to engage said shoulder.

3. A device in accordance with claim 1 wherein said collar is provided with an annular shoulder facing toward said stop member, said means for locking said collar comprising a vertically movable member normally arranged out of the path of axial movement of said collar and movable upwardly to engage said shoulder, said vertically movable member having a side remote from said stop member engageable with said shoulder, said side and said shoulder being arranged in parallel planes spaced apart a distance equal to the space between said one bearing and the adjacent end of said chuck whereby, upon manual retraction of said shaft to engage said chuck with said one bearing, said shoulder will be arranged above said side of said vertically movable member to be engaged by the latter upon upward movement thereof.

4. A device in accordance with claim 1 wherein the other of said bearings is provided with an externally threaded portion projecting toward said one bearing, and a sleeve threaded on said projecting end of said other bearing and against which said spring seat engages whereby, upon turning movement of said sleeve, the tension of said spring will be varied.

5. A tool comprising a bearing support having spaced vertical arms, co-axial horizontal bearings each supported by one of said arms, a shaft rotatable and slidable in said bearings, a tool chuck carried by said shaft outwardly of one of said bearings, a stop member fixed to said shaft inwardly of said one bearing and engageable therewith to limit movement of said chuck away from said one bearing, a collar slidable on said shaft and normally engaging said stop member, the other of said bearings having an externally threaded portion projecting toward said one bearing, a sleeve threaded on said projecting end of said other bearing, a spring seat engaging the end of said sleeve toward said collar, a compression spring surrounding said shaft and engaging at opposite ends against said collar and said spring seat, said collar having an annular shoulder facing toward said one bearing, a vertical sleeve supported beneath said shaft at the side of said collar toward said other bearing, a stem slidable in said vertical sleeve and having a yoke at its upper end normally arranged out of the path of travel of said collar axially of said shaft and movable upwardly to engage said shoulder upon retraction of said collar to fix said collar in spaced relation to said stop member to free the latter and said shaft for axial movement, and means for supporting said stem in its upper position with said yoke engaging said shoulder.

References Cited in the file of this patent

UNITED STATES PATENTS

| | | |
|---|---|---|
| 380,018 | Canedy | Mar. 27, 1888 |
| 1,038,914 | Long | Sept. 17, 1912 |
| 1,414,480 | Midgley | May 2, 1922 |
| 2,441,146 | Harrison | May 11, 1948 |